(12) United States Patent
Lee

(10) Patent No.: US 10,822,040 B2
(45) Date of Patent: Nov. 3, 2020

(54) ROOF PANEL ASSEMBLY OF VEHICLE

(71) Applicants: Hyundai Motor Company, Seoul (KR); KIA Motors Corporation, Seoul (KR)

(72) Inventor: Jin-Sung Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 91 days.

(21) Appl. No.: 16/192,096

(22) Filed: Nov. 15, 2018

(65) Prior Publication Data

US 2019/0185072 A1    Jun. 20, 2019

(30) Foreign Application Priority Data

Dec. 15, 2017 (KR) .................. 10-2017-0172980

(51) Int. Cl.
*B62D 27/02* (2006.01)
*B62D 25/06* (2006.01)

(52) U.S. Cl.
CPC ........... *B62D 27/023* (2013.01); *B62D 25/06* (2013.01)

(58) Field of Classification Search
CPC .............................. B62D 25/06; B62D 27/023
See application file for complete search history.

(56) References Cited

U.S. PATENT DOCUMENTS

2018/0346034 A1* 12/2018 Sheldon ................ B29C 70/023

FOREIGN PATENT DOCUMENTS

KR    2002-0074972    10/2002

* cited by examiner

*Primary Examiner* — D Glenn Dayoan
*Assistant Examiner* — Melissa Ann Bonifaz
(74) *Attorney, Agent, or Firm* — Brinks Gilson & Lione

(57) ABSTRACT

A roof panel assembly of a vehicle may include a roof panel made of composite material and assembled in a vehicle roof, and a center rail attached to the bottom surface of the roof panel. Both side end portions of the roof panel is assembled with roof rails of the vehicle. The center rail includes both end portions connected to roof rails of the vehicle, respectively. The roof panel further includes an auxiliary rail attached on the bottom of the roof panel and placed at a location spaced apart from the center rail at a rear side in the fore and aft direction of the vehicle.

16 Claims, 8 Drawing Sheets

- Prior Art -

- Prior Art -

ROOF PANEL ASSEMBLY OF VEHICLE

CROSS-REFERENCE TO RELATED APPLICATIONS

This application claims priority to and the benefit of Korean Patent Application No. 10-2017-0172980, filed on Dec. 15, 2017, which is incorporated herein by reference in its entirety.

FIELD

The present disclosure relates to a roof panel installed on a roof of a vehicle body for a vehicle.

BACKGROUND

The statements in this section merely provide background information related disclosure and may not constitute prior art.

A sunroof of a vehicle is generally used for better lighting and ventilation to passengers.

When the vehicle with the sunroof and the vehicle without the sunroof are manufactured, each of the vehicle body structures are different because their design and manufacturing processes of the vehicle body structures are different. In addition, there are differences in how a roof panel with or without the sunroof is assembled to the different vehicle body structure. Accordingly, we have discovered that the manufacturing processes for assembling the roof panel with or without the sunroof are different.

In addition, the vehicle body structures with and without the sunroof are different in the center of mass of the vehicle as well as in the stiffness of the vehicle.

In the case of the vehicle without the sunroof, the roof panel is generally manufactured by the same material as the vehicle body, for example a steel, which makes it difficult to lighten the roof panel. Accordingly, it results in an adverse aspect of fuel efficiency in the vehicle.

For example, FIG. 1 shows a vehicle without a sunroof, and FIG. 2 shows a vehicle with a sunroof.

The vehicles in FIGS. 1 and 2 are identical to form an A-pillar 112 and a B-pillar 113 in order to connect all the roof rails 111 to the vehicle body. In FIG. 1, the reinforcement member 114 for connecting the roof rails 111 spaced apart from each other in the structure of the vehicle body is attached to the vehicle with the roof panel 121, but in FIG. 2, the reinforcement member 114 is not attached to the vehicle with the sunroof 122. Therefore, the structure of the vehicle body in FIG. 1 is different from the structure of the vehicle body in FIG. 2.

The above information disclosed in this Background section is only for enhancement of understanding of the background of the present disclosure, and therefore it may contain information that does not form the prior art that is already known to a person of ordinary skill in the art.

SUMMARY

The present disclosure is directed to provide a roof panel assembly of a vehicle capable of assembling to a vehicle body for common use regardless of whether a sunroof is installed or not.

The present disclosure provides a roof panel assembly of a vehicle made of lightweight material to lighten the vehicle even through the sunroof is not installed.

A roof panel assembly of a vehicle according to the present disclosure may include a roof panel made of composite material and assembled in a vehicle roof, and a center rail attached to a bottom surface of the roof panel with both end portions of the center rail connected to roof rails of the vehicle, respectively.

The roof panel may be made of Fiber Reinforced Plastic (FRP) material or Sheet Molding Compound (SMC) material.

On the bottom surface of the roof panel, protruded portions protruding along the lateral direction of the vehicle are formed at a location spaced apart in a fore and aft direction of the vehicle for limiting a movement of the center rail.

According to a further aspect of the present disclosure, the center rail may be arranged at a location where a B-pillar of the vehicle is installed.

The center rail may be bent upwardly at both longitudinal sides of the center rail to form a flange portion that is connected to the roof panel. The center rail may be bonded to the roof panel with adhesive. The flange portion may be bent downwardly to form a convex portion spaced apart from the roof panel.

At each of the end portions of the center rail, a hanging jaw bent downward is formed and configured to limit a movement of both side end portions of the roof panel into the vehicle.

Beads may be formed to protrude on the bottom surface of the roof panel with a lattice shape along the fore and aft direction and the lateral direction of the vehicle.

According to a further aspect of the present disclosure, an auxiliary rail is formed to be parallel with the center rail at a location spaced apart from the center rail in a fore and aft direction of the vehicle with both end portions thereof connected with the roof rails of the vehicle, respectively.

On the bottom surface of the roof panel, protruded portions protruding along the lateral direction of the vehicle are formed at a location spaced apart in the fore and aft direction of the vehicle for limiting a movement of the auxiliary rail.

The auxiliary rail may be provided at a location spaced apart from the center rail at a rear in the fore and aft direction of the vehicle.

Guiders may be formed at the bottom surface of the roof panel to protrude downwardly at intervals along the perimeter of the roof panel and to be fitted in penetration holes formed in the roof rail.

Spacers may be interposed between the roof panel and the roof rails.

The spacers may be made of a rubber material.

Side brackets may be installed at both side end portions of the roof panel, respectively, for fixing the roof panel to the roof rails.

A hollowed portion, which has a cross-section of a closed curved line in order to form a hollow and filled with core material therein, may be formed at both side end portions of the roof panel.

In accordance with the roof panel assembly of the vehicle according to the present disclosure, it is able to apply to the common structure of the vehicle body regardless of whether a sunroof is installed or not.

Furthermore, unlike steel-based materials, resin-based composite material is used for the roof panel, so that it is able to lighten the vehicle, thereby improve fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
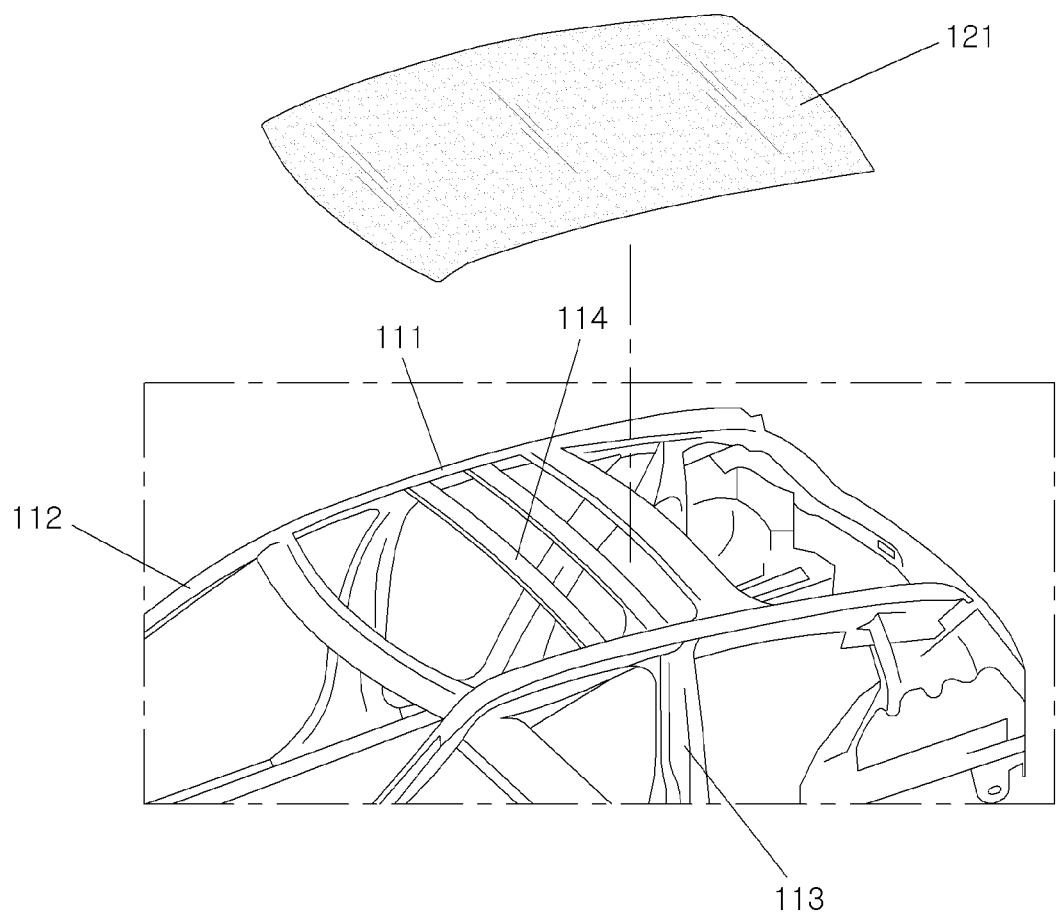
FIG. 1 shows a perspective view of a roof side structure of a vehicle without a sunroof according to a conventional art.
Figure 2:
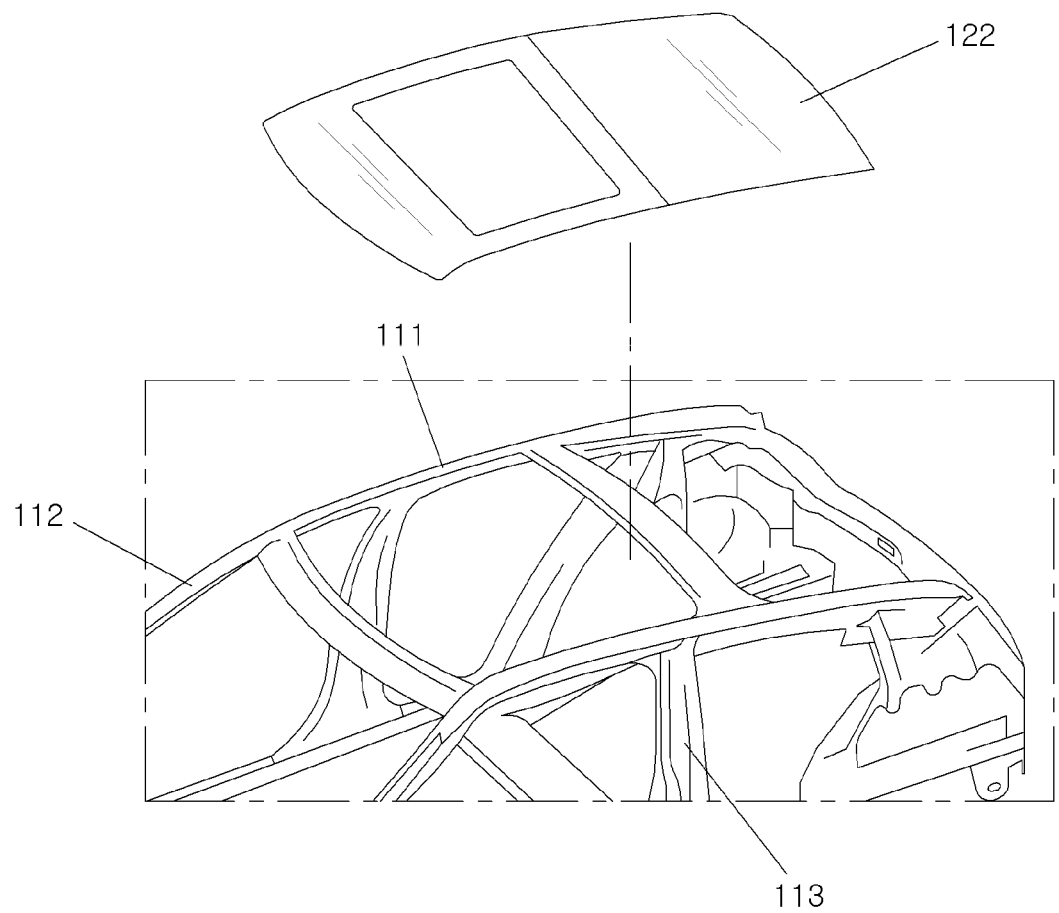
FIG. 2 shows a perspective view of a roof side structure of a vehicle with a sunroof according to a conventional art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
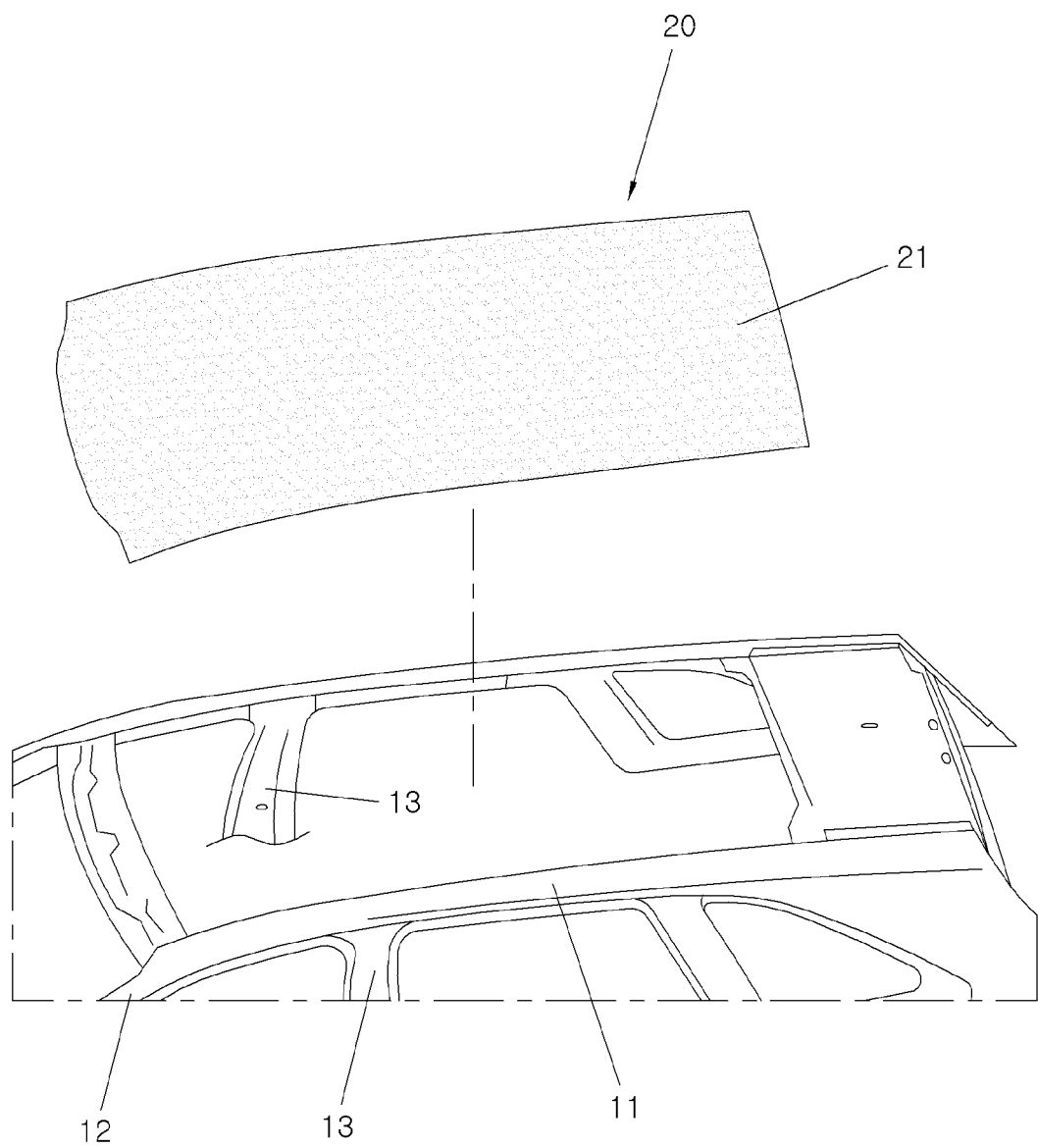
FIG. 3 is a perspective view showing a roof panel assembly of a vehicle installed in the vehicle according to the present disclosure.
Figure 4:
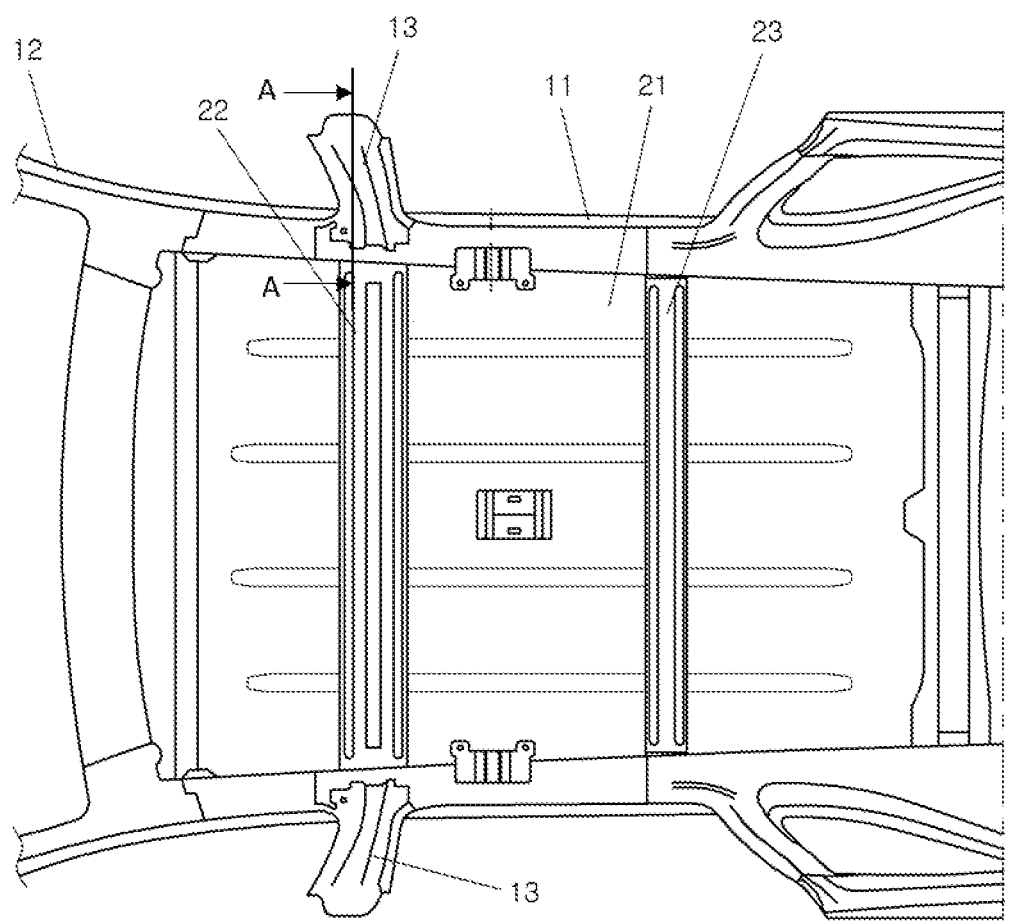
FIG. 4 shows a perspective bottom view of the roof panel assembly of the vehicle according to the present disclosure installed in the vehicle.

Referring to FIGS. 3 and 4, A roof panel assembly 20 of a vehicle (not shown) according to the present disclosure may include a roof panel 21 made of a composite material and assembled in a vehicle roof, a center rail 22 attached to a bottom surface 21d of the roof panel 21 and having both end portions 22d connected to a roof rail 11 of the vehicle, respectively.

The roof panel 21 may be formed with a size corresponding to the roof area of the vehicle.

The roof panel 21 may be formed by the length between the upper end portion of the A-pillar 12 and the rear end portion of the vehicle roof and the width between the roof rails 11 spaced apart from each other.

The roof panel 21 may be made of composite material. The roof panel 21 may be made of Sheet Molding Compound (SMC) material, so that the roof panel 21 can be made lighter than a conventional vehicle roof made of steel material. The SMC is a kind of Fiber Reinforced Plastic (FRP) which is a material that the resin is impregnated into the sheet using the pressure and temperature of the press in the state that the fibers are arranged in a sheet-like resin. The SMC has a high strength equivalent to steel, which can replace the roof panel of steel material and can be molded at low temperature. In addition, the molding cycle is relatively fast and large-area molded parts can be manufactured, thereby making it suitable for vehicle roof panels. The SMC can be used as a material to reduce the weight on the vehicle roof side, thereby improving fuel efficiency of the vehicle and lowering the center of mass of the vehicle to improve driving stability.

Figure 5:
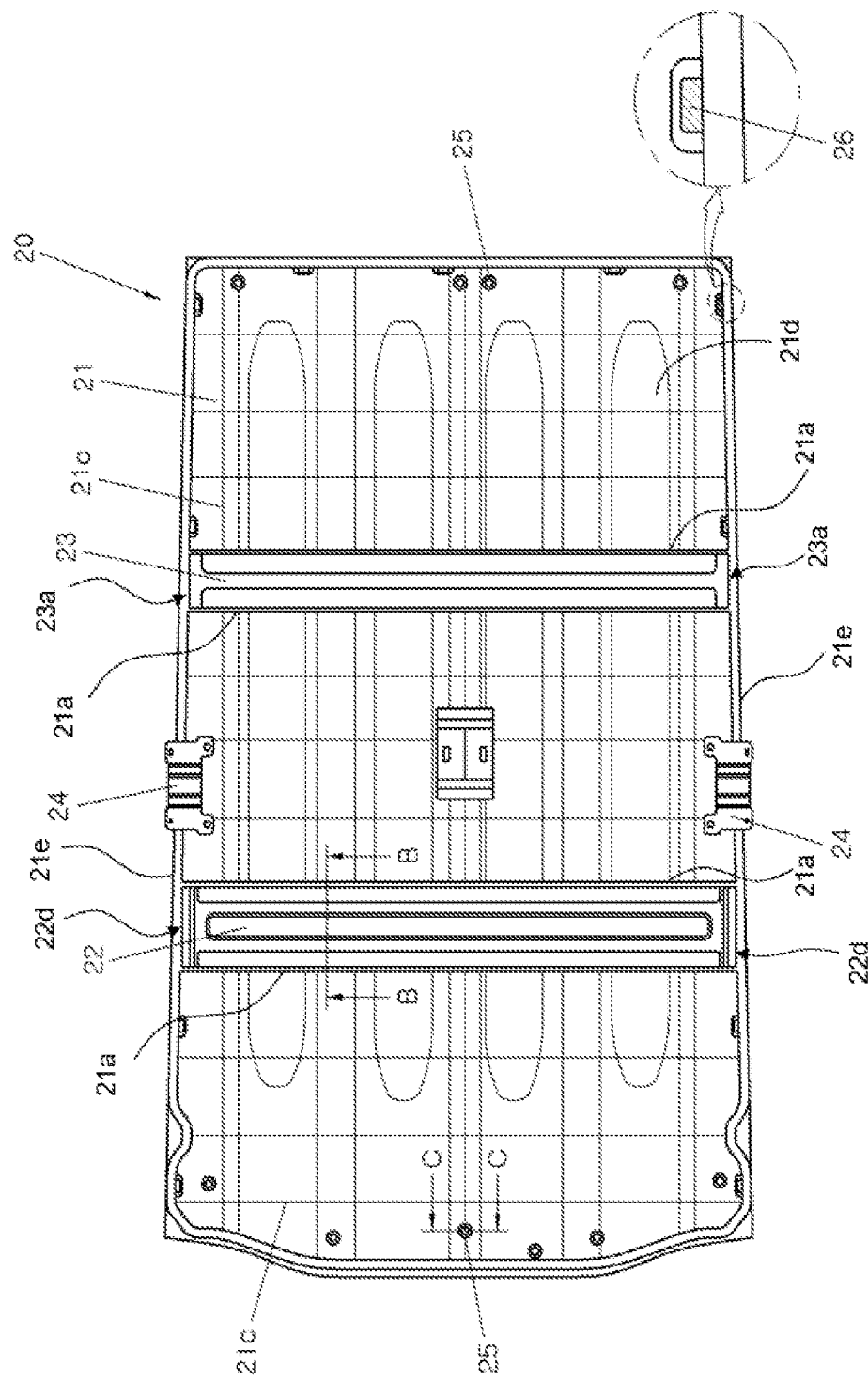
FIG. 5 is a perspective bottom view of the roof panel assembly of the vehicle according to the present disclosure.
Figure 7:
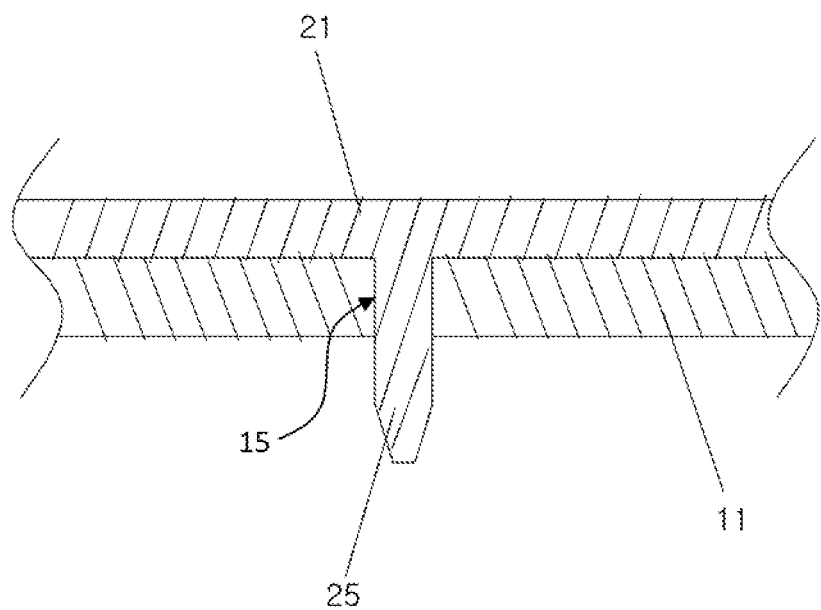
FIG. 7 is a cross-sectional view, taken along line C-C of FIG. 5.

Referring to FIG. 5, the bottom surface 21d of the roof panel 21 may form guiders 25 protruding downwardly at intervals along a perimeter of the roof panel 21. The guiders 25 may be inserted into penetration holes 15 formed in the roof rail 11 (refer to FIG. 7). The guiders 25 may be coupled at a predetermined location when the roof panel assembly 20 is installed in the vehicle roof.

As shown in FIG. 5, beads 21c protruding from the bottom surface 21d of the roof panel 21 on a lattice shape may be installed on the bottom surface 21d of the roof panel 21. The beads 21c may be formed at the bottom surface 21d of the roof panel 21 in a forward and backward directions (i.e. a fore and aft direction of the vehicle) and a left and right directions (i.e. a lateral direction of the vehicle), respectively, of the vehicle. Since the beads 21c are formed in the lattice shape on the bottom surface 21d of the roof panel 21, so that the basic rigidity of the roof panel 21 can be secured.

Figure 8:
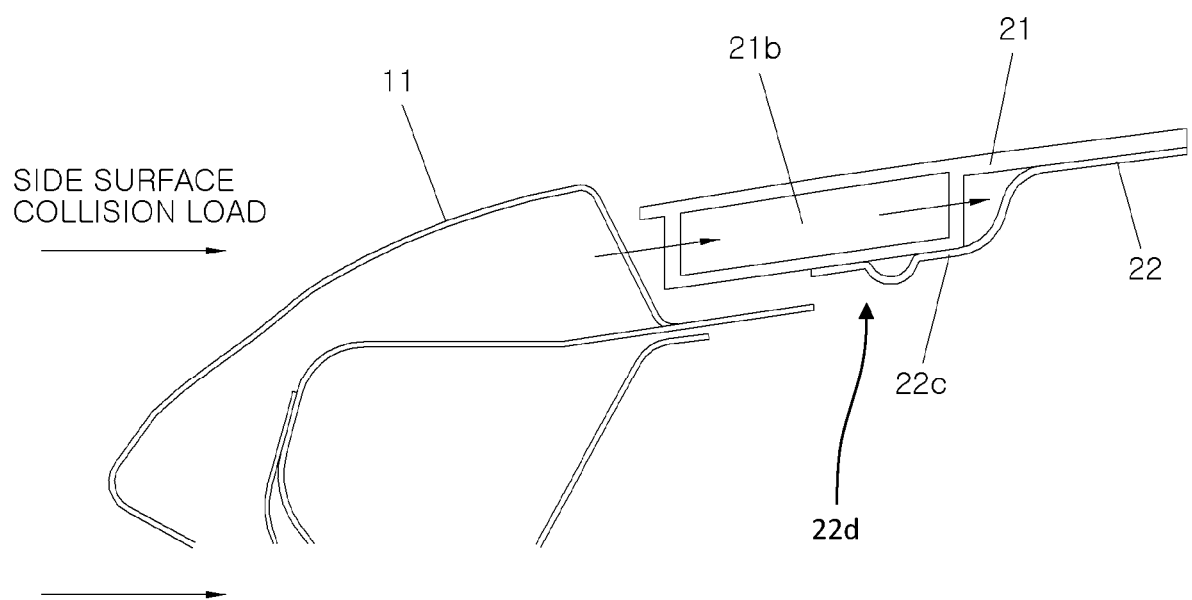
FIG. 8 is a cross-sectional view, taken along line A-A of FIG. 4.

Referring to FIG. 8, on the other hand, side end portions 21e of the roof panel 21 may form a hollow portion 21b which forms a hollow therein and has a cross-section of a closed curved line shape. The hollow portion 21b may be filled with a core material (not shown) so that the hollow portion 21b and the core material can absorb the impact first when the side collision occurs.

Referring back to FIGS. 4 and 5, spacers 26 made of rubber material may be interposed between the roof panel 21 and the roof rail 11 when the roof panel 21 is assembled to the vehicle roof. The spacers 26 may be assembled in order to protrude downward from the roof panel 21 to be contacted to the roof rail 11 when the roof panel 21 is assembled to the vehicle roof, so that the spacers 26 can absorb the vibration generated between the roof panel 21 and the roof rail 11 when the vehicle is running. The spacers 26 may be arranged in a plurality of numbers at intervals along the perimeter of the roof panel 21.

In FIG. 5, side brackets 24 for coupling the roof rail 11 to the roof panel 21 may be installed on both sides of the roof panel 21.

The center rail 22 may be attached to the bottom surface 21d of the roof panel 21 in the lateral direction of the vehicle. The center rail 22 may be made of a steel and both end portions 22d thereof may be coupled to the roof rail 11 to reinforce the strength in a lateral direction of the roof panel assembly 20.

Figure 6:
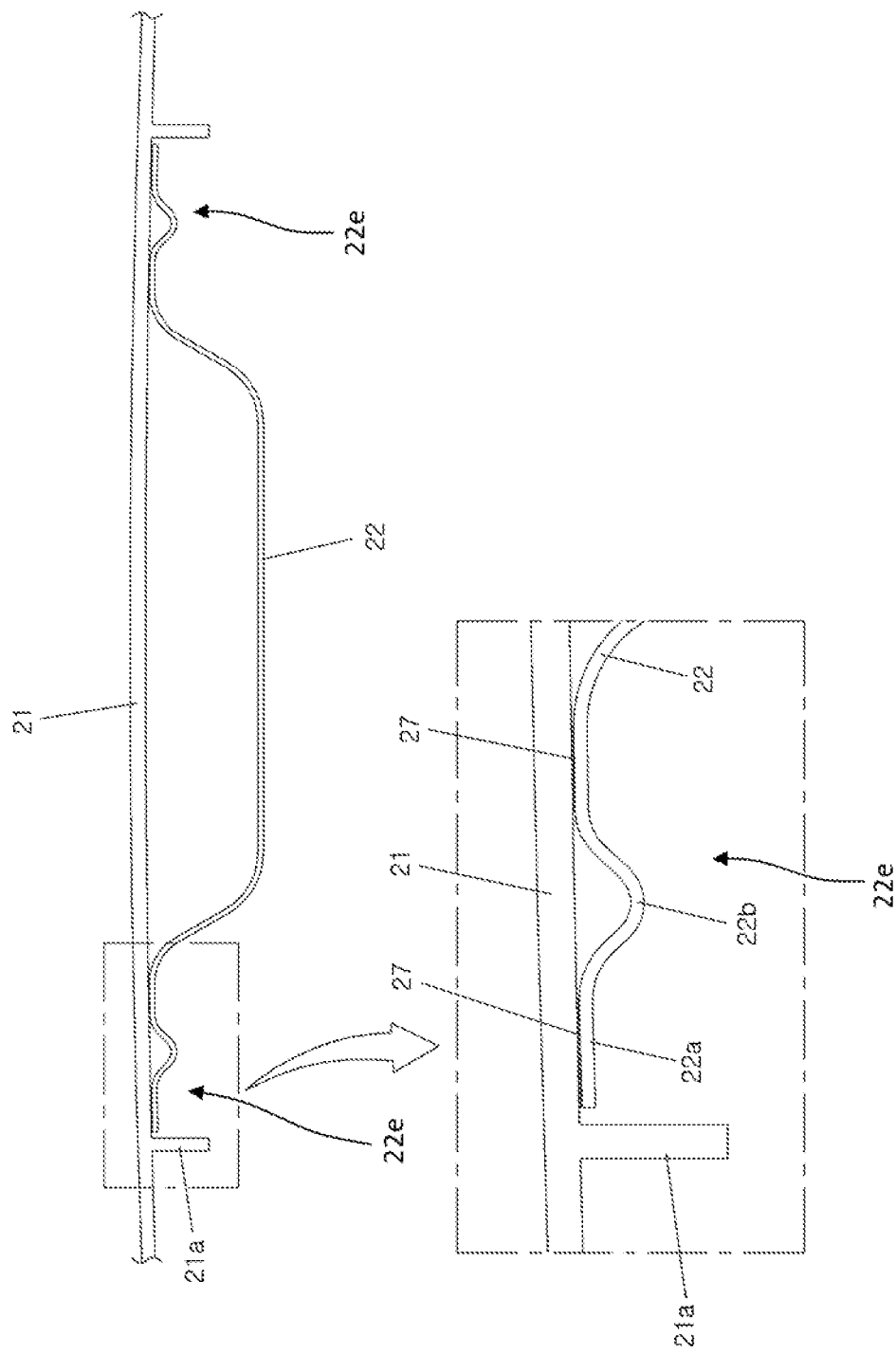
FIG. 6 is a cross-sectional view, taken along line B-B of FIG. 5.

FIG. 6 shows a cross-sectional view of the center rail 22, take along line B-B of FIG. 5. The center rail 22 may be formed with a flange portion 22a bent upwardly relative to a middle portion of the center rail 22 along both longitudinal sides 22e of the center rail 22, and the flange portion 22a is attached to the bottom surface 21d of the roof panel 21 along the lateral direction of the roof panel 21.

In FIG. 6, The center rail 22 may be bonded to the roof panel 21 with an adhesive 27. The adhesive 27 may be applied between the upper surface of the flange portion 22a and the bottom surface 21d of the roof panel 21 so that the center rail 22 is bonded to the roof panel 21. In addition, a convex portion 22b, which is convexly downwardly formed on the flange portion 22a and separated from the roof panel 21, may be formed to determine the amount of the adhesive 27 applied between the center rail 22 and the roof panel 21.

On the other hand, the center rail 22 may be installed at the location where the B-pillar 13 is formed (refer to FIG. 4), so that the strength in the lateral direction of the vehicle can be improved.

Furthermore, as shown in FIG. 6, in order to limit the location of the center rail 22 on the roof panel 21, protruded portions 21a may be formed on the bottom surface of the roof rail 11. The protruded portions 21a may be protruded along the lateral direction of the vehicle and spaced from the bottom surface 21d of the roof panel 21 in the fore and aft direction of the vehicle. Since the protruded portions 21a restrain the center rail 22 in the fore and aft direction of the vehicle, the protruded portions 21a restrain the center rail 22 to inhibit or restrict the center rail 22 from being deformed when the impact load due to the pillar deformation is applied to the center rail 22 by a vehicle collision.

Referring back to FIG. 5, an auxiliary rail 23 may be installed at a location spaced apart from the center rail 22 in the fore and aft direction of the vehicle. The auxiliary rail 23 may be installed parallel to the center rail 22 to reinforce the lateral directional rigidity of the roof panel assembly 20. As shown in FIG. 5, both end portions 23a of the auxiliary rail 23 are also connected with the roof rails 11 of the vehicle, respectively. The auxiliary rail 23 may be formed at a location spaced from the center rail 22 toward the front or the rear of the vehicle in order to be parallel with the center rail 22. According to the present disclosure, the auxiliary rail 23 may be preferably formed at a location spaced from the center rail 22 to the rear of the vehicle.

The auxiliary rail 23 may be also limited in location by the protruded portions 21a formed on the bottom surface 21d of the roof panel 21. The auxiliary rail 23 is also inhibited or restricted from changing the shape of the auxiliary rail 23 by the protruded portions 21a upon collision, like the center rail 22.

The roof panel assembly 20 according to the present disclosure having the above-described configuration is installed in an upper portion, i.e., a roof of a vehicle.

The roof panel assembly 20 is manufactured separately from the vehicle body in a single unit, and then, assembled to the vehicle body. The roof rail 11 of the vehicle body and the side brackets 24 installed on both sides of the roof panel 21 are assembled by using fastening means such as bolts.

Furthermore, FIG. 8 shows the process of transferring the load at the side collision. Due to side collision of the vehicle, when the collision load is applied to the roof rail 11, it is transmitted to the side end portion 21e of the roof panel 21. The collision load inputs to the side end portion 21e of the roof panel 21 is primarily absorbed by the hollow portion 21b formed on the side end portion 21e of the roof panel 21 and the core material (not shown) filled in the hollow portion 21b. Thereafter, it is caught in and supported by a hanging jaw 22c formed to be bent downward at both end portions 22d of the center rail 22 for absorbing the impact instead of moving toward the inside of the vehicle.

In accordance with another form of the present disclosure, a roof panel assembly 20 with a sunroof may be also assembled to the vehicle body, which has the same structure when the vehicle body is assembled with the roof panel assembly 20 without the sunroof. Accordingly, the vehicle body can be made in a common structure regardless of whether or not the sunroof is installed. In the assembly of the vehicle without the sunroof depending on the option, the roof panel assembly 20 can be assembled with the common structure of the vehicle body used in assembling in the vehicle with the sunroof. Therefore, the common structure of the vehicle body can be used for any roof panel regardless of whether the sunroof is installed or not.

While this present disclosure has been described in connection with what is presently considered to be practical exemplary forms. It is to be understood that the present disclosure is not limited to the disclosed forms, but, on the contrary, is intended to cover various modifications and equivalent arrangements included within the spirit and scope of the present disclosure.

What is claimed is:

1. A roof panel assembly of a vehicle, comprising:
   a roof panel made of composite material and assembled in a vehicle roof; and
   a center rail attached to a bottom surface of the roof panel, both end portions of the center rail connected to roof rails of the vehicle, respectively,
   wherein on the bottom surface of the roof panel, protruded portions protruding along a lateral direction of the vehicle are formed at a location spaced apart in a fore and aft direction of the vehicle for limiting a movement of the center rail.

2. The roof panel assembly of the vehicle of claim 1, wherein the roof panel is made of Fiber Reinforced Plastic (FRP) material.

3. The roof panel assembly of the vehicle of claim 1, wherein the roof panel is made of Sheet Molding Compound (SMC) material.

4. The roof panel assembly of the vehicle of claim 1, wherein the center rail is arranged at a location where a B-pillar of the vehicle is installed.

5. A roof panel assembly of a vehicle, comprising:
   a roof panel made of composite material and assembled in a vehicle roof; and
   a center rail attached to a bottom surface of the roof panel, both end portions of the center rail connected to roof rails of the vehicle, respectively,
   wherein the center rail is bent upwardly at both longitudinal sides of the center rail to form a flange portion that is connected to the roof panel, and
   wherein the flange portion is bent downwardly to form a convex portion spaced apart from the roof panel.

6. The roof panel assembly of the vehicle of claim 5, wherein the center rail is bonded to the roof panel with adhesive.

7. The roof panel assembly of the vehicle of claim 1, wherein at each of the end portions of the center rail, a hanging jaw bent downward is formed and configured to limit a movement of both side end portions of the roof panel into the vehicle.

8. A roof panel assembly of a vehicle, comprising:
   a roof panel made of composite material and assembled in a vehicle roof; and
   a center rail attached to a bottom surface of the roof panel, both end portions of the center rail connected to roof rails of the vehicle, respectively,
   wherein beads are formed to protrude on the bottom surface of the roof panel with a lattice shape along a fore and aft direction and a lateral direction of the vehicle.

9. The roof panel assembly of the vehicle of claim 1, wherein an auxiliary rail is formed to be parallel with the center rail at a location spaced apart from the center rail in a fore and aft direction of the vehicle with both end portions thereof connected with the roof rails of the vehicle, respectively.

10. The roof panel assembly of the vehicle of claim 9, wherein on the bottom surface of the roof panel, protruded portions protruding along a lateral direction of the vehicle are formed at a location spaced apart in the fore and aft direction of the vehicle for limiting a movement of the auxiliary rail.

11. The roof panel assembly of the vehicle of claim 9, wherein the auxiliary rail is provided at a location spaced apart from the center rail at a rear in the fore and aft direction of the vehicle.

12. The roof panel assembly of the vehicle of claim 1, further comprising guiders formed at the bottom surface of the roof panel to protrude downwardly at intervals along a perimeter of the roof panel and to be fitted in penetration holes formed in the roof rails.

13. The roof panel assembly of the vehicle of claim 1, wherein spacers are interposed between the roof panel and the roof rails.

14. The roof panel assembly of the vehicle of claim 13, wherein the spacers are made of a rubber material.

15. The roof panel assembly of the vehicle of claim 1, wherein side brackets are installed at both side end portions of the roof panel, respectively, for fixing the roof panel to the roof rails.

16. The roof panel assembly of the vehicle of claim 1, wherein a hollowed portion, which has a cross-section of a closed curved line in order to form a hollow and filled with core material therein, is formed at both side end portions of the roof panel.

* * * * *